Aug. 21, 1951     L. S. WEAST     2,564,939
FOLDABLE SHOPPING CART
Filed Sept. 29, 1947
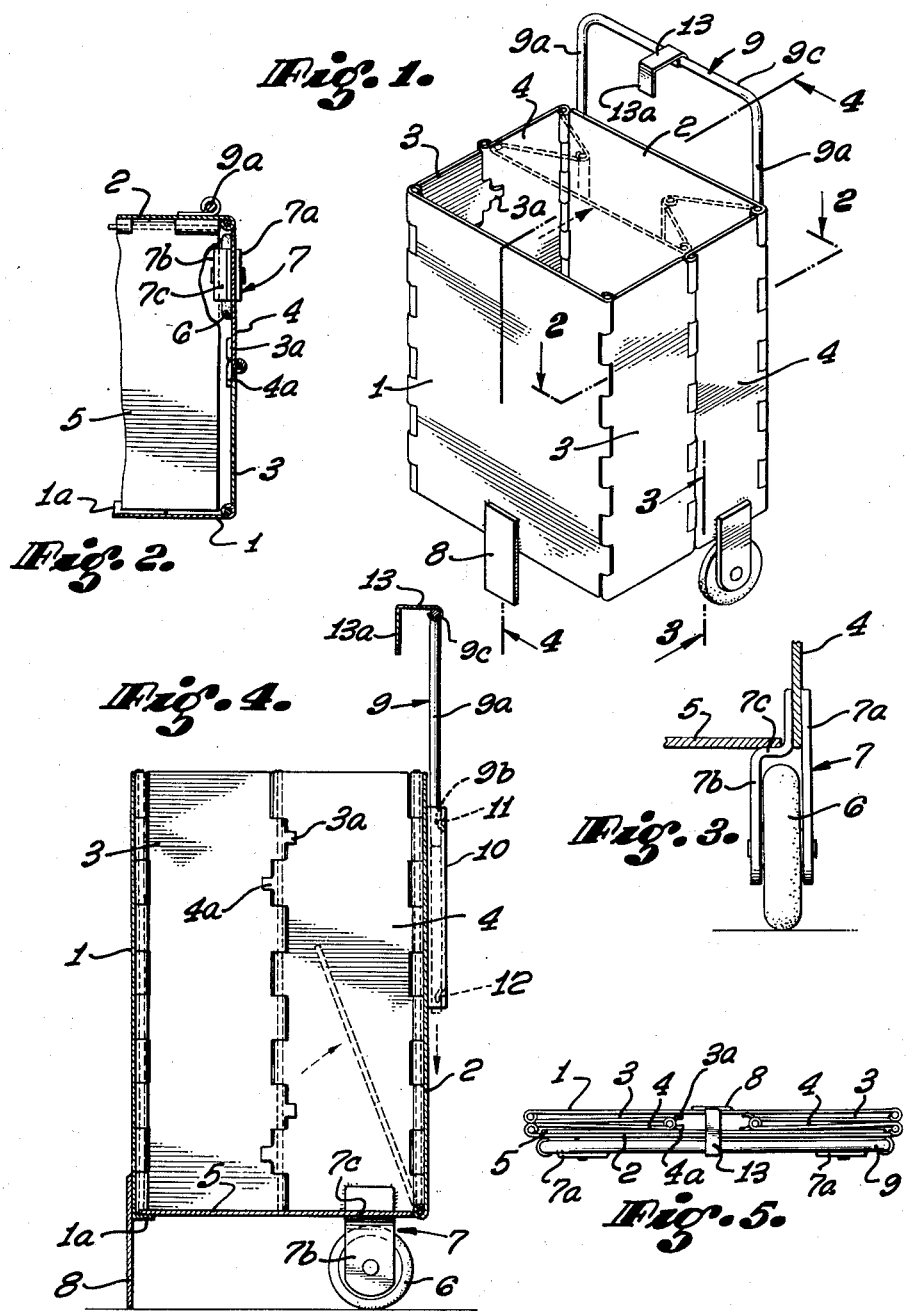
INVENTOR.
LOUIS S. WEAST
BY
      William E. Hall
          ATTORNEY.

Patented Aug. 21, 1951

2,564,939

UNITED STATES PATENT OFFICE 2,564,939

FOLDABLE SHOPPING CART

Louis S. Weast, Los Angeles, Calif.

Application September 29, 1947, Serial No. 776,709

3 Claims. (Cl. 280—36)

My invention relates to a parcel carrier, and more specifically to a carrier of this class commonly referred to as a shopping cart.

One of the principal objects of this invention is to provide a carrier, or cart, of this class having the convenience and capacity of those now in use, but which, when not in use, may be collapsed, or folded, to extremely or relatively small dimensions so that it may be carried as a relatively small bundle, or stored in relatively small or narrow space.

A specific object of this invention is to provide a collapsible, or foldable, cart of this class in which the wheels for supporting the cart, when in use, may be folded with and flatwise with respect to some of the walls when folded.

Another important object of this invention is to provide accordion-like side walls which may be readily collapsed inwardly when the cart is folded, but which are constructed so as to limit outward shifting beyond the unfolded positions of the walls.

A further important object of this invention is to provide a novelly constructed and mounted handle which may be readily drawn outwardly to provide a bail and readily shifted inwardly, out of the way, when not in use, an important feature of the invention being to provide a latch on the handle for retaining the members of the cart in folded condition when the handle is shifted inwardly.

An important object also of this invention is to provide a cart of this class which is simple and economical of construction, durable, and which will not readily get out of order.

With these and other objects in view, as will appear hereinafter, I have devised a shopping cart having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a perspective view of a shopping cart, or similar carrier, incorporating my invention, the dotted lines showing certain members in a partially folded or collapsed condition;

Fig. 2 is a fragmentary transverse sectional view thereof, taken through 2—2 of Fig. 1;

Fig. 3 is an enlarged sectional elevational view, showing the wheel mounting of the shopping cart;

Fig. 4 is a sectional elevational view thereof, taken through 4—4 of Fig. 1, the dotted lines showing the upwardly foldable bottom and the downwardly shiftable handle; and, Fig. 5 is a top end view, showing the shopping cart wholly folded or collapsed.

The body of my shopping cart, when unfolded, is in the form of a vertically elongated open-top box of horizontal rectangular cross-section. It consists of a front wall 1, a back wall 2, pairs of foldable side walls 3 and 4, and a bottom panel 5. The side walls or wall members 3 and 4 are hingedly connected at one edge on a substantially vertical axis, and the opposite vertical or free edges of the walls 3 and 4 are hingedly connected, respectively, to the vertical edges of the front and back walls or wall members 1 and 2. The side walls or wall members are foldable inwardly, in accordion fashion, when the body is to be collapsed, as shown in Fig. 5, and shiftable outwardly in coplanar relation when the body is open or unfolded, as shown in Figs. 1, 2 and 4.

The walls or wall members 3 and 4 are provided at their inner sides and adjacent their pivotal connections with ears $3^a$ and $4^a$, which extend beyond the main portions of the wall members and which are offset inwardly, as shown best in Figs. 2 and 4. These ears are arranged to engage the inner sides of the wall members 4 and 3, respectively, in order to prevent the wall members from being forced outwardly beyond a position in which the panel members 3 and 4 are coplanar.

The bottom panel 5 is hinged at one edge to the bottom edge portion of the back wall member 2 and, when the body is unfolded, the panel is folded downwardly from the inner side of the back wall member toward the bottom edges of the other side wall members to form a bottom for the body. The front wall member has an inwardly turned flange $1^a$ for supporting the free edge of the bottom panel when the latter is folded downwardly.

The wheels 6 are rotatably supported on brackets 7 which are secured to the lower portions of the side wall members 4. The brackets 7 consist substantially of straps $7^a$ and $7^b$. As shown, the straps $7^a$ extend downwardly from the outer side of the wall members 4 while the straps $7^b$ are secured and extend downwardly from the inner sides thereof. The straps $7^b$ have offset portions $7^c$ which form shoulders upon which the lateral edges of the bottom member 5 rest, as shown best in Fig. 3. These wheels 6 with their respective brackets 7 are foldable with the side walls 4 in such a manner that they assume substantially flat positions with respect to the wall members and the other members of the device when folded, as shown in Fig. 5.

The front wall 1 has a downwardly extending leg 8 which, together with the wheels 6, provides a three-legged support for the shopping cart, as in the usual construction.

The device has a handle or bail 9 which is of U-shaped construction. The legs 9$^a$ are positioned at the opposite sides of the cart and are slidably mounted in sleeves 10 secured to the rear side of the back wall 2. When in operation, the handle or bail is extended, as shown in Figs. 1 and 4, but when the cart is collapsed the handle or bail may be shifted inwardly. The sleeves 10 may have spring latches 11 and 12 at their upper and lower ends which may enter recesses 9$^b$ in the legs of the handle 9 for yieldably holding the handle or bail in extended or folded position.

On the cross-member 9$^c$ of the bail is provided a resilient retaining member 13 having a downwardly extending portion 13$^a$, which is adapted to engage the front side of the front wall member 1, when the cart is collapsed, in order to hold the same in a collapsed or folded condition.

I wish it to be understood that I do not desire to be limited to the exact details of construction shown and described, for obvious modifications will occur to a person skilled in the art.

I claim:

1. In a folding cart of the class described, a body comprising front and back walls, a bottom member hinged to the bottom edge of one of the former, pairs of hinged side walls, the edges opposite the hinge-connected edges of the walls of each pair being hinged to the corresponding edges of the front and back walls, a bracket mounted on one of the corresponding walls of each pair of walls and extending beyond the bottom edge thereof, a wheel revolubly mounted on each bracket, the plane of each wheel being arranged substantially parallel to the plane of the side wall on which it is mounted, said bottom panel being capable of being lowered to hold the several walls of the cart in unfolded condition, the inner sides of the bracket having shoulders for supporting the edge of the panel.

2. In a folding cart of the class described, a body comprising front and back walls, a bottom member hinged to the bottom edge of one of the former, pairs of hinged side walls, the edges opposite the hinge-connected edges of the walls of each pair being hinged to the corresponding edges of the front and back walls, a bracket mounted on the rear wall of each pair of walls and extending beyond the bottom edge thereof, a wheel revolubly mounted on each bracket, the plane of each wheel being arranged substantially parallel to the plane of the side wall on which it is mounted, said bottom panel being capable of being lowered to hold the several walls of the cart in unfolded condition, the inner sides of the bracket having shoulders for supporting the edge of the panel.

3. In a folding cart of the class described, a body comprising front and back walls, a bottom member hinged to the bottom edge of one of the former, pairs of hinged side walls, the edges opposite the hinge-connected edges of the walls of each pair being hinged to the corresponding edges of the front and back walls, and a U-shaped handle having its legs slidably and extensibly mounted at the lateral portions of the back side of the back wall, the connecting portion of the handle, when the legs are drawn outwardly, forming a bail for the cart, and, when drawn inwardly, being substantially flush with the upper edge of the back wall, said cross-portion having a finger for engaging the front side of the front wall, when the cart is collapsed and the handle drawn inwardly, for retaining the cart in a folded condition.

LOUIS S. WEAST.

REFERENCES CITED

The following references are of record in the file of this patent:

UNITED STATES PATENTS

| Number | Name | Date |
|---|---|---|
| 1,409,838 | Emery et al. | Mar. 14, 1922 |
| 2,180,642 | Mochan | Nov. 21, 1939 |
| 2,371,472 | Ruff et al. | Mar. 13, 1945 |
| 2,380,016 | Black | July 10, 1945 |
| 2,401,986 | Talbott | June 11, 1946 |